United States Patent [19]
Schick

[11] 4,429,993
[45] Feb. 7, 1984

[54] METHOD AND APPARATUS FOR TESTING THE CORRESPONDENCE OF LINE OF SIGHT WITH TARGET LINE

[75] Inventor: Dieter Schick, Solms, Fed. Rep. of Germany

[73] Assignee: Ernst Leitz Wetzlar GmbH, Wetzlar, Fed. Rep. of Germany

[21] Appl. No.: 316,953

[22] Filed: Oct. 30, 1981

[30] Foreign Application Priority Data

Nov. 25, 1981 [DE] Fed. Rep. of Germany ....... 3044554

[51] Int. Cl.$^3$ .................. G01B 11/26; G01C 1/00
[52] U.S. Cl. .................. 356/152; 356/150; 356/151
[58] Field of Search ............ 356/150, 151, 141, 152

[56] References Cited
U.S. PATENT DOCUMENTS

| | | | |
|---|---|---|---|
| 3,021,749 | 2/1962 | Merlen | 356/151 |
| 3,865,483 | 2/1975 | Wojcik | 356/152 |
| 3,881,105 | 4/1975 | De Lang et al. | 356/152 |
| 4,097,750 | 6/1978 | Lewis et al. | 356/152 |
| 4,193,689 | 3/1980 | Reymond et al. | 356/141 |

FOREIGN PATENT DOCUMENTS 1218856 1/1971 United Kingdom .

OTHER PUBLICATIONS

"Fachbericht B3" 6 page brochure published by Messen-Stevern-Regeln, Dachauer Str. 42, Munich, West Germany.
"RCA COS/MOS Integrated Circuits" Book (1974) pp. 503-526, published by RCA Corporation.
"CCD" (4 page) brochure published by Fairchild, CCD 5 K 11, 78.
"BIFET Operationsverstärker, TL061 Serie, TL071 Serie & TL081 Serie" Brochure (5 pages) 1979 published by Texas Instruments Inc.

Primary Examiner—S. C. Buczinski
Attorney, Agent, or Firm—Wells & Wells

[57] ABSTRACT

Method and apparatus for testing the correspondence of the line of sight of optical instruments with the target line of weapons. A predetermined measuring field and a photoelectric line-type sensor are used. The nominal positions of the lines of sight and of the target lines relative to each other are stored as coordinates in a long-time memory. Simultaneously a nominal reference point as the origin of the coordinate system stored in the long-time memory is determined.

The method and apparatus are carried out in the following sequence:

(a) one light-dot is generated within the measuring field per line of sight and per target line and these light-dots correspond to the actual positions of the lines relative to each other;

(b) one of the light-dot is selected as the reference point (origin of the measurement coordinate system);

(c) the light-dots are scanned by the sensor during a linear relative motion between the measuring field and the sensor;

(d) the electric sensor output signals obtained during the scanning are compared, possibly after intermediate storage, in a computer with corresponding signals read out of the long-time memory; and (e) the signals resulting from the comparison and representing the deviation of the actual measured position from the nominal position are displayed and/or used as control criteria.

15 Claims, 13 Drawing Figures

METHOD AND APPARATUS FOR TESTING THE CORRESPONDENCE OF LINE OF SIGHT WITH TARGET LINE

CROSS-REFERENCE TO A RELATED APPLICATION

Applicant claims priority under 35 USC 119 for application P 30 44 554.6, filed Nov. 26, 1980 in the Patent Office of the Federal Republic of Germany.

BACKGROUND OF THE INVENTION

The present invention is concerned with a method and apparatuses for testing the correspondence of the line of sight of optical instruments with the target line of weapons, using a predetermined measuring field and an electrical, line-type sensor.

The state of this art may be ascertained by reference to Fachbericht B3 in Messen, Steuern, Regeln of Fa. OEM, Dachauerstraße 42, 8000 München, Federal Republic of Germany.

The nominal positions of the lines of sight and of the target lines are determined relative to one another and are stored in coordinate values in a long-time memory. Simultaneously a nominal reference point as the origin of the system of coordinates is determined and stored in this long-time memory.

It is known to use so-called fixing collimators where a reticle with symbol markings is mounted in the focal plane of the collimator objective, these symbol markings being projected on identical symbol markings in the instruments of which the mutual angular position in elevation and azimuth must be checked. When there is agreement in both the angles of elevation and azimuth, the projected symbol markings coincide with those of the instruments to be tested.

Such instrumentation suffers from the drawback that the reticle for the sake of easy synopsis is provided with only a low number of symbol markings, only a restricted number of devices can be aligned or tested and that the accuracy of alignment or testing depends on a subjective assessment of the coincidence between the markings.

In order to make such observations more objective, it has already been proposed to carry out the testing of the assembly of instruments requiring a precise angular arrangement by means of autocollimating and photoelectric systems. This is done by illuminating a hairline reticle and by imaging it by means of an objective into infinity. After reflection from a mirror this image is then reproduced by the same objective on a measuring reticle designed as an electrical sensor in the form of a row of photodiodes and mounted in the image plane of this autocollimating system. In this way the position of the hairline can be sensed, analyzed and displayed.

Such an instrument for testing the correspondence of the line of sight with the target line suffers from the drawback that one such autocollimating instrument with photoelectric detection of the test mark location must be provided for every optical device and every weapon to be checked when the coincidence of such optical devices' lines of sight with such weapons' target line is tested. This means that in addition to the high cost in instrumentation, such a testing system can be used only specifically for one application and can only be employed in stationary manner. Further increased costs are incurred by the somewhat complex adjustment of the instrumentation.

SUMMARY OF THE INVENTION

It is therefore the object of the present invention to provide a method and an apparatus for its implementation permitting with merely a single mobile test device the checking of the correspondence of the lines of sight of optical devices with the target lins of weapons while using a photoelectric detection of the test mark position.

This object is achieved for a method for testing the correspondence of the line of sight of optical instruments with the target line of weapons by:

(a) generating within the measuring field, for each line of sight or target line one light-dot corresponding to the actual positions of these lines relative to each other;

(b) selecting one of the light-dots as the reference point (origin of the measurement coordinate system);

(c) scanning the light-dots during a relative linear motion between the measuring field and the sensor by this sensor;

(d) comparing the electrical output signals obtained by the sensor during scanning, possibly following an intermediate storage in a computer, with corresponding signals read out of the long-time memory; and (e) displaying the signals resulting from the comparison and representing the deviation of the particular measured value from the nominal value and/or using said signals as control criteria.

The apparatus to implement the method is characterized by:

(a) an imaging system, wherein a predetermined area of its image plane is defined as the measuring field;

(b) a photo-electric, line-type sensor mounted in the image plane of this imaging system;

(c) optical means for projecting the light-dots corresponding to the lines of sight or target lines into the measuring field;

(d) means to generate a linear relative motion between the measuring field and the sensor for the purpose of scanning the light-dots in the measuring field by the sensor;

(e) an electronic circuit arrangement having long-time memories wherein the predetermined nominal positions of the lines of sight and the target lines are stored relative to each other and where the position of a nominal reference point is stored in terms of coordinates, for the purpose of analyzing the sensor electric output signals obtained during scanning; and (f) display and/or control means to represent the particular deviation of the actual value from the nominal value and/or to control suitable setting means for adjusting the lines of sight, these setting means being actuated by the electrical signals generated from this deviation.

Favorable other objects and advantages of the invention, including particular advantages offered by several constructions of the apparatus disclosed herein, will become more apparent by reading the following description in conjunction with the accompanying drawings.

BRIEF DESCRIPTION OF THE DRAWINGS

Embodiments of the invention are shown schematically in the drawings and are described in further detail below, wherein.

DESCRIPTION OF THE PREFERRED EMBODIMENTS

Figure 1:
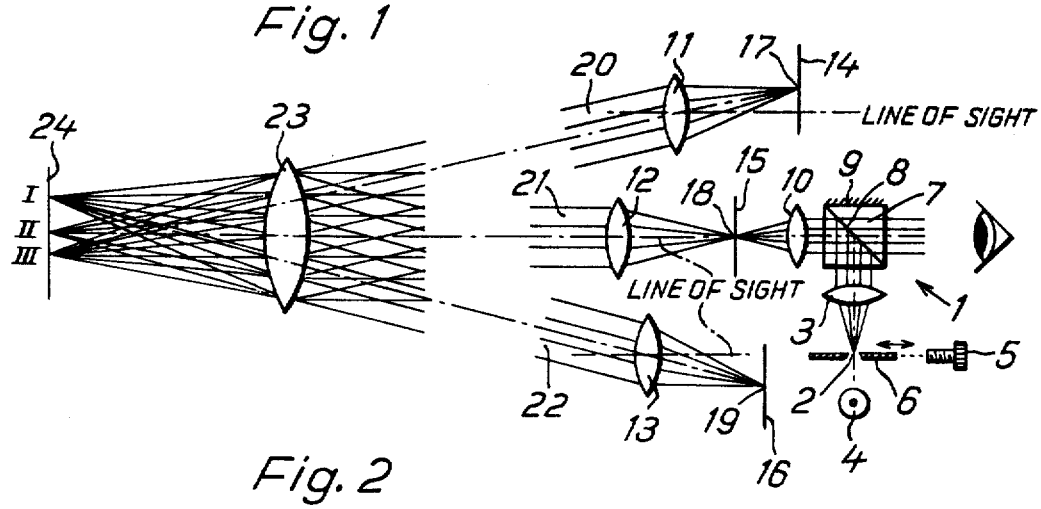
FIG. 1 shows schematic representations which explain the operation of the invention.
Figure 2:
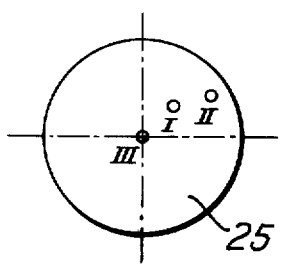
FIG. 2 is a top plan view at 24 of FIG. 1 showing a measuring field with the light-dots corresponding to the target line(s)

The operation of the apparatus of the invention is described with particular reference to FIG. 1. For the sake of clarity, only one light-dot projector 1 is shown. Projector 1 consists of an illumination stop 6 mounted at the focal point 2 of a converging lens 3 and adjustable by a setscrew, of a light source 4 and of a beam-splitting cube 7 with a splitting surface 8 and a fully mirrorized base 9. These projectors are set on eyepieces 10, of which only one is shown for the sake of clarity, of optical instruments for instance sighting telescopes or periscopes indicated herein by the objective lenses 11, 12, 13. The luminous marking is present in a fixed manner in the weapon collimators, which need no light-dot projectors. Each of these liquid-dot projectors 1, separately from the other projectors, images one light-dot I, II or III as shown in FIG. 2, in the reticle planes 14, 15 or 16 of the eyepiece 10. These reticle planes 14, 15 and 16 contain test markings 17, 18, 19 which are made to be coincident with the corresponding light-dots I, II and III, respectively.

Objective lenses 11, 12, 13 producing collimated beams 20, 21, 22 are projecting the light-dots I, II and III into an imaging system 23 which images them into an image plane 24 wherein a specific area 25, as shown in FIG. 2, is defined as the measuring field 25. The light-dot, for instance III, which represents the weapon target line, is so aligned in the measuring field 25 that the other light-dots I and II are lieing within the measuring-field 25 in a constant orientation with respect to each other.

A specific dot is assigned to each optical instruments 11, 12, 13, whether it belongs to the sighting means or to the weapons, in the measuring field 25 at 24 of the imaging system 23. This dot represents the predetermined nominal positions of the optical instruments 11, 12, 13 relative to each other. Deviations from these positions correspond to the angular alignment errors.

There would be at least two possibilities for one photoelectrc detection of the actual positions of the light-dots I, II or III. On the one hand the measuring field 25 could be constructed as a receiving matrix. This, however, would require a very high number of individual receivers. Available matrix receivers, however, are not comprehensive enough to cover such a measuring area, and moreover, they are very expensive.

On the other hand, a 4-quadrant diode could be placed at every measurement site where the deviation between the actual position of the light-dots I, II, III from their nominal position is determined. However, a very high accuracy of relative position between these diodes is required for such receivers. Also, a special testing means would be required for each instrument unit for which the mutual position of several lines of sight and target lines would have to be checked and measured.

The present invention overcomes these difficulties. As shown in perspective and schematically in FIG. 3, a line-type sensor 26, for instance a CCD array, is mounted in the measuring field 25 defined in the image plane 24 of the imaging system 23, the length of this array corresponding at least to the size of the measuring field 25. By CCD array is meant a charge-coupled device as disclosed in FAIRCHILD's leaflet CCD 5 K 11.78. The measuring field 25 and the sensor 26 are moved relative to each other to determine the actual position of the light-dots I, II and III. This relative motion is perpendicular to the long side of the sensor 26 and guides the light-dots I, II and III over the sensor 26. The relative motion is implemented by a pivotable mirror 27 mounted in front of the imaging system 23 and the pivot range of this mirror, in the direction of the double arrow 28, amounts to at least ±½ the measuring field size. This relative motion, however, can also be implemented as shown in FIG. 4, by using a drive means and reciprocating therewith the sensor 26 in the direction of the double arrow 29 across the measuring field 25, the light-dots I, II and III then being projected by a fixed deflecting mirror 30 and the imaging system 23 into this measuring field 25.

Due to this scanning motion, sequential electrical output signals are obtained at various heights of the sensor 26, by means of which the height differences between the individual light-dots I, II and III in the measuring field 25 are ascertained. When one light-dot, preferably the one corresponding to the target line, is taken as the given reference point, then all the light-dots corresponding to the lines of sight must be at a specific position (height difference) with respect to this reference point when the lines of sight are properly aligned with respect to the target line. Deviations from this position correspond to an error in elevation (elevation angle error) in the adjustment between the line of sight and the target line.

The lateral or azimuth error is determined by the time interval by which the light-dots pass the sensor 26 during scanning. It is conceivable, however, to ascertain this error from the path difference resulting between the individual light-dots I, II and III due to the paths they have covered when reaching the sensor 26.

Figure 5:
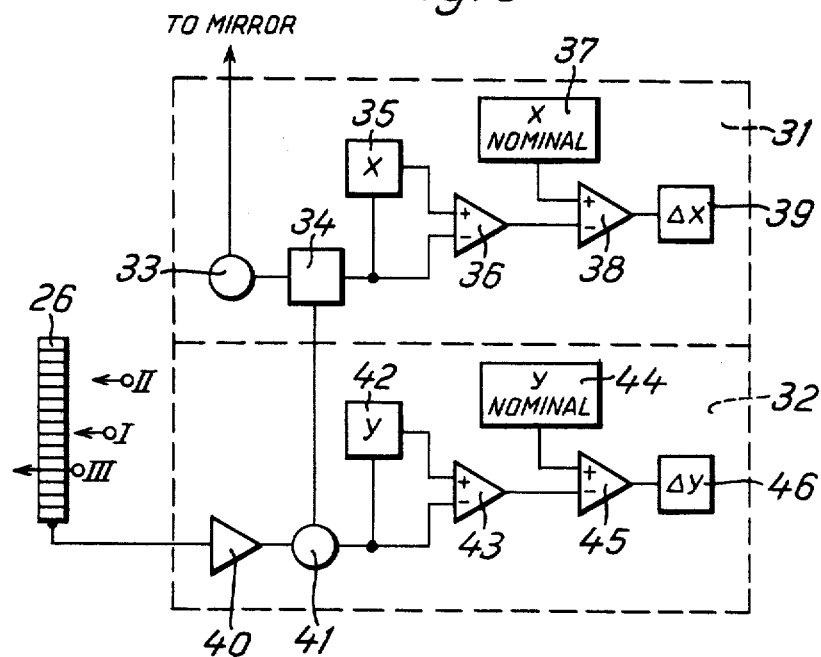
FIG. 5 is a diagram of a circuit for use in the analysis of the electrical signals generated by the system of FIG. 3.

FIG. 5 gives one example of a circuit used to analyze the electrical output signals obtained at the sensor 26 when the measuring field 25 is scanned as described above.

The circuit arrangement is divided into blocks 31, 32 corresponding to the actual positions to be determined in the x and y coordinates of the light-dots I, II and III. The block 31 contains a clock pulse generator 33 having the manufacturer RCA Solid State, Box 3200, Somerville, N.J., USA and the description CD 4047A connected to the pivotable mirror 27 or to the drive of the sensor 26, a short time memory 34, a reference point memory 35 for the x-coordinate, a first differential amplifier 36, a long-time memory 37 for the nominal positions of the lines of sight in the x coordinate, a second differential amplifier 38 and a display instrument 39 to display the difference between the nominal and the actual positions in the x coordinate.

The block 32 comprises a preamplifier 40 connected to the output of the line-type electric sensor 26. The preamplifier 40 is followed by a pulse generator 41. The block 32 moreover comprises a reference point memory 42 for the y coordinate, a first differential amplifier 43, a long-time memory 44 for the nominal values of the lines of sight in the y coordinate, a second differential amplifier 45 and a display instrument 46 to display the difference between the nominal and the actual positions in the y coordinate.

The switch-over from the block 31 to the block 32 takes place by connecting the short-time memory 34 to the pulse generator 41. The circuit arragement described so far operates as follows:

The nominal positions of the lines of sight and target lines for the x and y coordinates are stored in the long-time memories 37 and 44, respectively, provided to that end. If now one of the light-dots I, II, III passes over the line-type sensor 26, the latter will generate an electric output signal corresponding to the position of the light-dot on the sensor 26 and hence to its actual position in the y coordinate in the measuring field 25. The output signal from the sensor 26 passes through the amplifier 40 to the pulse generator 41 which in turn emits a pulse to the short-time memory 34. The time or the path required or covered by the light-dot from the beginning of the scanning motion to the passing of the dot over the sensor 26 is thus stored by this pulse to determine the actual position in the x coordinate. This information is supplied to the short-time memory 34 by the clock pulse generator 33 which is connected to the pivoting mirror 27 or a sensor drive means (not shown). The signals of clock pulse generator 33, are counted in the short-time memory. From the thus attained actual positions of the light-dots I, II, III in the two coordinates, one, preferably that corresponding to the weapon, is selected as the reference. The values selected as the references are stored in the reference point memories 35 and 42 and are compared in the first differential amplifiers 36 and 43, respectively of the blocks 31 and 32 with the x and y coordinate-values ascertained for the other light-dots. The difference signals so generated are compared in the second differential amplifiers 38 and 45 of the blocks 31 and 32, respectively with the nominatl position values stored in the long-time memories 37 and 44, respectively of the x and y coordinates for the lines of sight and the target lines, respectively. The electric signals generated from this comparison control the display instruments 39 and 46, respectively. The difference shown there indicates the magnitude of the adjusting error.

Figure 6:
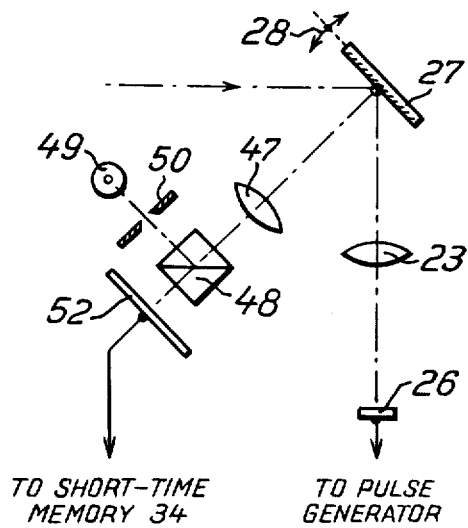
FIG. 6 is a schematic side view showing an apparatus of the invention with an accessory to ascertain the lateral offset of the light-dots.
Figure 7:
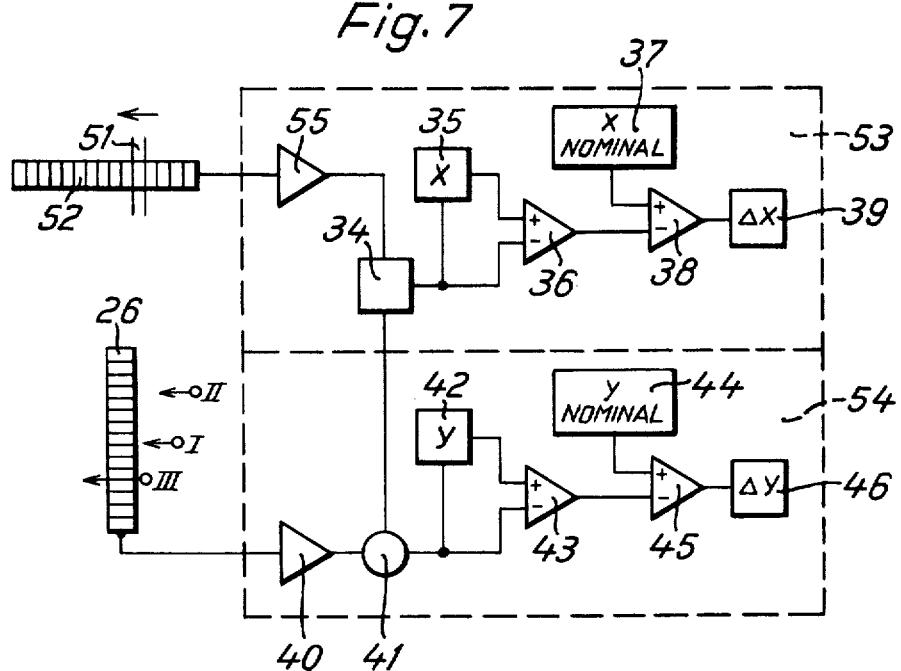
FIG. 7 is a diagram of a circuit for analyzing the electrical signals generated by the device of FIG. 6.

Another feasibility in determining the lateral deviations (azimuth errors) in the lines of sight and target lines from their nominal positions is shown in FIG. 6. Here the previously described arrangement is broadened by an autocollimation system consisting of the combination of the pivoting mirror 27 and a collimator objective 47, a beam-splitting cube 48 and a light source 49 with a slit-stop 50. By means of this autocollimation system, one luminous marking 51, as shown in FIG. 7, is projected on an electrical line-type sensor 52 located outside the measuring field 25 and the image field of the imaging system 23. This sensor 52 is arranged to sense the lateral deviation of the lines of sight and target lines from their nominal positions with respect to the sensor 26. The position of the luminous marking 51 on the sensor 52 defines the lateral position of the lines of sight and of the target lines.

FIG. 7 is an example of analysis of the electrical signals generated by the arrangement shown in FIG. 6. It corresponds essentially to the circuit arrangement of FIG. 5. This circuit too is divided into two blocks 53,54, where the arrangement of the block 54 corresponds to that of the block 32 in FIG. 5. Block 53 differs from block 31 described in FIG. 5 merely in that it is associated with sensor 52 of which the output signals pass through preamplifier 55 to short-time memory 34.

The checking of the light-dots corresponding to the actual positions of the lines of sight and target lines with respect to their nominal positions takes place similarly to the description relating to FIG. 5. The signal values for the x and y coordinates corresponding to the nominal positions are stored in the long-time memories 37 and 44. Preferably, and implemented by the motion of the pivoting mirror 27, the light-dot which is selected as the reference point is firstly allowed to wander over the sensor 26. When the light-dot passes over the sensor 26, the sensor generates an output signal corresponding to the position in the y-coordinate in the measuring field 25. The signal is stored in the reference point memory 42. The luminous marking 51 projected by the autocollimating system (27 and 47–50) on the sensor 52 moves synchronously with the light-dot. The position of the luminous marking on the sensor 52 corresponds with the actual position of the light-dot in the measuring field 25 in the y-coordinate. An electrical signal is generated at the output of the sensor 52 when the light-dot passes over the sensor 26. This instant is determined by the output signal generated by the sensor 26 at the light-dot crossing, whereby the pulse generator 41 controls the short-time memory 34 by means of one pulse causing the storage of the output signal from sensor 52. This signal, which represents the x-coordinate of the reference light-dot, is stored in the reference point memory 35. The actual position determination of all other light-dots then takes place as described in relation to FIG. 5.

Figure 8:
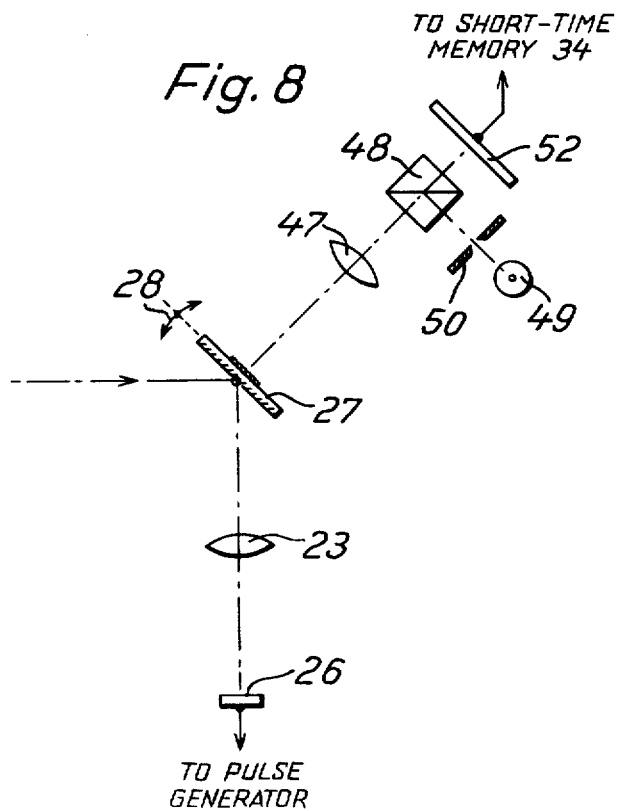
FIGS. 8 through 10 are schematic side views showing embodiments of the apparatus of the invention.

FIG. 8 schematically shows another embodiment of the device of the present invention. The autocollimating system 27 and 47 through 50 for checking the azimuth angle is offset by 180° compared to the arrangement of FIG. 6. Accordingly, too the plane pivoting mirror 27 is fully reflective on both sides. However, as shown by FIG. 8, the pivoting mirror 27' associated with the autocollimating system need only be specular in that area which is required to generate the autocollimating beam. The arrangement operates in the same manner as described in relation to FIG. 6.

Figure 9:
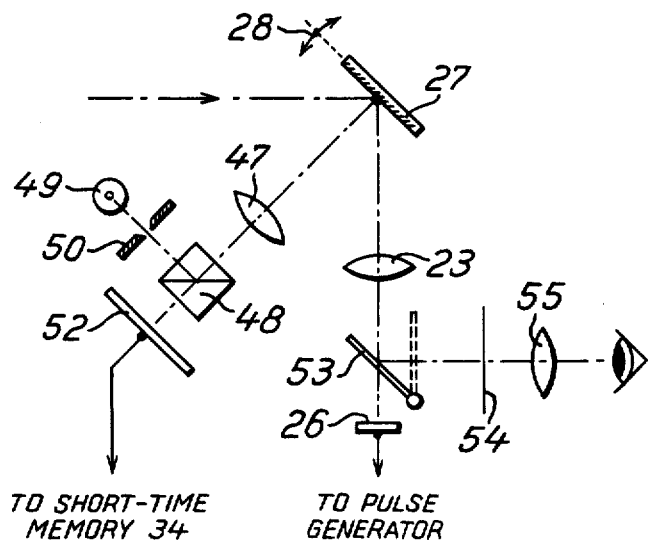

In order to be able also to visually observe the measuring field, a hinged mirror 53 can be placed in the beam path after the imaging system 23, as shown in FIG. 9, this hinged mirror 53 images the measuring field 25 onto an intermediate image plane 54 when the pivotable mirror 27 is locked at mid-position, the measuring field 25 then being observed using an eyepiece 55. In an embodiment with corresponding line marking (not shown) in the intermediate image plane 54, the apparatus can be coarsely adjusted.

Figure 10:
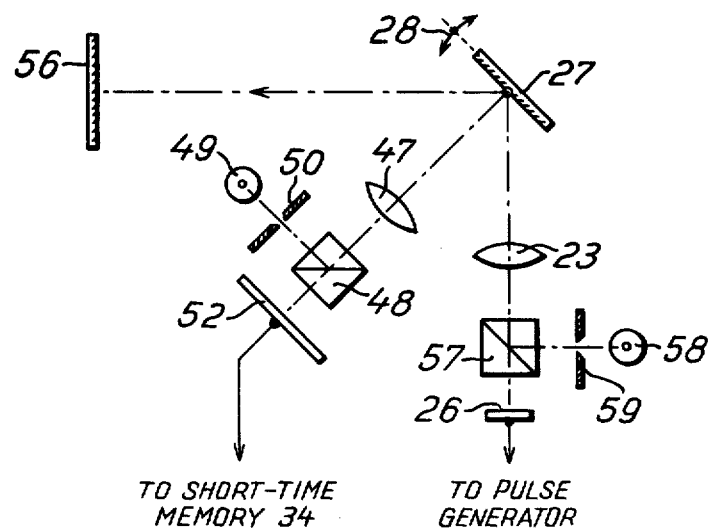
Figure 11:
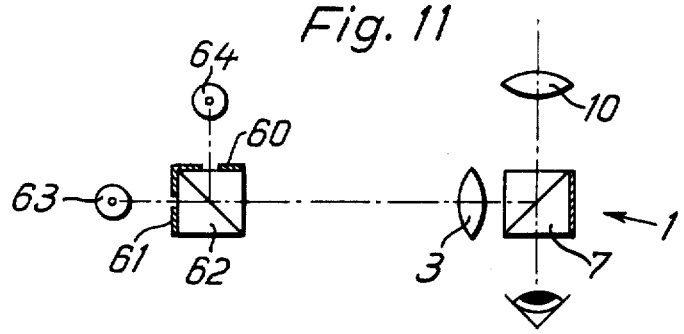
FIG. 11 is a schematic plan view showing a light-dot projector having the feasibility to observe the position of the light-dot(s)

As shown in FIG. 10, it is also possible to operate the apparatus in autocollimating manner. In this case, plane mirrors 56, of which only one is shown for the sake of clarity, replace the light-dot projectors 1.

The light-dots I, II, III generated by a light source 58 with aperture stop 59 are projected by means of the pivotable mirror 27 and a beam splitter 57 onto these plane mirrors 56.

However, a special autocollimation has to be placed in front of every target telescope or periscope to be tested.

Figure 12:
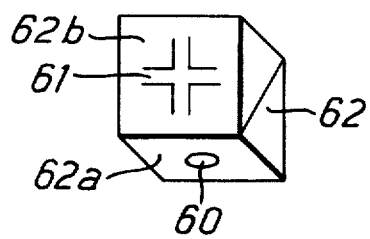
FIG. 12 is a detailed perspective view of the beam-splitting cube of FIG. 11.

In order to better align the light-dots I, II, III generated by the light projectors 1 with the adjustment markings 17, 18, 19 of the optical instruments 11, 12, 13, line markings like the aperture stop 60 and double cross bar 61, as shown in FIG. 12 in detail, are reflected into the beam paths of the light-dot projectors 1. These line markings 60, 61 are very precisely positioned with respect to each other on mutually associated external surface 62a, 62b of a beam-splitting cube 62 are illuminated each by one light source 63, 64. The aperture stop 60, which generates the light-dots I, II, III, is aligned with the adjustable markings 17, 18, 19 by means of those line markings, visual adjustment taking place by means of the double cross bar 61.

Figure 13:
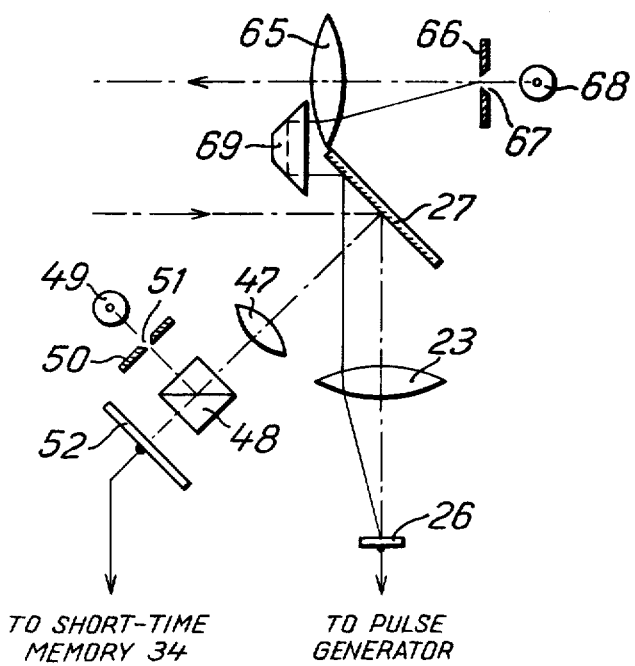
FIG. 13 is a schematic side view of an apparatus of the invention combined with an infrared image collimator.

FIG. 13 shows schematically the combined arrangement of the test apparatus with an infrared image collimator, showing only one collimator objective 65 for the sake of simplicity. A point stop 67 is located in the image plane 66, shown in dashed lines, of the collimator objective 65. This point stop 67 is illuminated by a light source 68. The light-dot generated by the point stop 67 passes through the collimator objective 65 and through a triple reflecting prism 69 into the test device and is imaged in the image plane 24 of the imaging system 23 of the apparatus. The light-dot is measured in the same manner as the light-dots I, II, III.

The triple reflecting prism of FIG. 13 is fixedly mounted in such a manner that it projects only partly into the pupils of the infrared image collimator and the imaging system 23 of the device. In this manner the position between the infrared image collimator and the test apparatus cxan be checked continuously.

Should there by optical difficulties due to the vignetting of the pupils, the triple reflecting prism 69 can be removed from the beam path. In this case, a check of the state of adjustment between the infrared image collimator and the test apparatus takes place ahead of all other measurements.

BEST MODE OF CARRYING OUT THE INVENTION

With particular reference to FIGS. 6 and 7, the elements of the apparatus are constructed as follows:

| Element | Manufacturer | Manufacturer's Designation |
|---|---|---|
| Line-type Sensor 52 | FAIRCHILD | CCD 110F, CCD 121H |
| Pre-amplifier 55 | TEXAS INSTRUMENTS | TL 061 |
| Short-time memory 34 | RCA Corp. | CD 4000 A |
| Reference point memory 35 | RCA Corp. | CD 4000 A |
| Differential amplifier 36 | TEXAS INSTRUMENTS | TL 061 A |
| Long-time memory 37 | RCA Corp. | CD 4000 A |
| Differential amplifier 38 | TEXAS INSTRUMENTS | TL 061 A |
| Display 39 | RCA Corp. | CD 4000 A |
| Line-type Sensor 26 | FAIRCHILD | CCD 110F, CCD 121H |
| Pre-amplifier 40 | TEXAS INSTRUMENTS | TL 061 |
| Pulse generator 41 | RCA Corp. | CD 4047 A |
| Reference point memory 42 | RCA Corp. | CD 4000 A |
| Differential amplifier 43 | TEXAS INSTRUMENTS | TL 061 A |
| Long-time memory 44 | RCA Corp. | CD 4000 A |
| Differential amplifier 45 | TEXAS INSTRUMENTS | TL 061 A |
| Display 46 | RCA Corp. | CD 4000 A |

Figure 3:
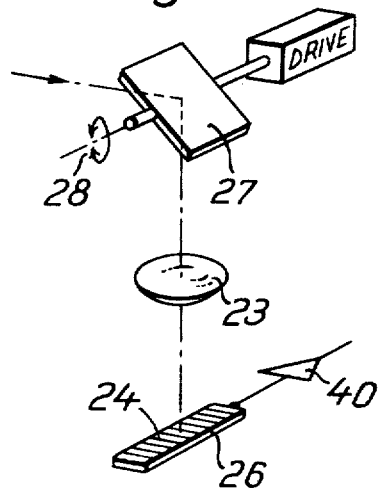
FIGS. 3 and 4 are perspective showings of systems with means for generating the relative motion between the measuring field and the sensor.
Figure 4:
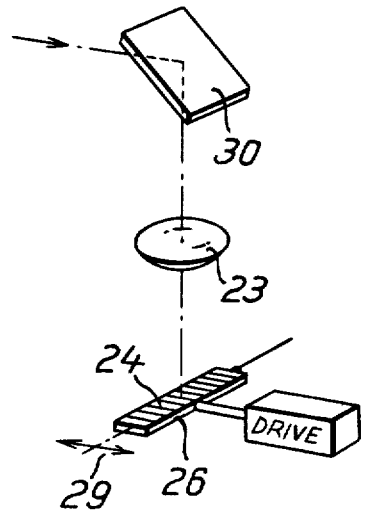

The circuit arrangement of FIG. 7 is referred to for explaining the method of carrying out a test of the correspondence of the line of sight with a target line using the apparatus of FIG. 6 as follows:

As described to FIGS. 3 and 4 for each line of sight and each target line of light-dot I,II and III respectively is created and projected into a common measuring field 25. The actual position of the light-dots I,II,III with respect to each other and in one coordinate direction is ascertained by scanning the measuring field 25 using a sensor 26 in form of a CCD-array, the individual photoelectric detectors of which generating electrical signals on being passed by the light-dots. For determining the actual positions of the light-dots with respect to each other in the second sensor 52 in form of a CCD-array is provided and arranged outside the measuring field 25. By means of the autocollimating system consiting of the pivoting mirror 27, the collimator 47, the beam-splitting cube 48 and the light source 49 with slit-stop 50, a luminous marking 51 is produced besides the light-dots I,II,III and projected on the line-type sensor 52.

The electrical signals generated by the two sensors 26 and 52 respectively are analyzed in the circuit shown in FIG. 7. When on the relative movement between measuring field 25 and sensor 26 caused by tilting the pivoting mirror 27 the first of the light-dots I, II, III is crossing the sensor 26 the corresponding individual detector of the sensor 26 (CCD-array) is generating an electrical signal which is representative of the actual position of this light-dot in the y-coordinate direction within the measuring field 25. This signal is passed via amplifier 40 and pulse generator 41 to reference point memory 42—as the first light-dot crossing the sensor 26 is selected for the reference point.

Synchronously with the light-dots crossing over the sensor 26 the luminous marking 51 is migrating over sensor 52. The electrical signal arising at the output of the individual detector of sensor 52 corresponding with the actual position of the luminous marking 51 on sensor 52 is stored in the reference point memory 35 for the x-coordinate direction. The storage of the signal is caused by a pulse emitted by pulse generator 41 to short-time memory 34 on light-dot's crossing of sensor 26.

The signals stored in the reference point memories 35 and 42 are transmitted via differential amplifiers 36 and 43 respectively to differential amplifiers 38 and 45 respectively wherein they are compared with electrical signals stored in long-time memories 37 and 44 respectively and representative for the nominal positions of the line of sight and target line in the x- and y-coordinate direction. The difference between the signals representing the difference in spacing between the nominal and actual positions of the light-dots I, II, III is displayed in instruments 39 and 46 respectively. On visual observation the apparatus can be manually adjusted until the nominal and actual position of the light-dots coincide. For automatic adjustment a control signal may be generated from the signal difference for controlling a follow-up instrument.

For determining the actual positions of all other light-dots the procedure as described is repeated.

I claim:

1. An apparatus for testing the correspondence of at least one line of sight of an optical instrument with at least one target line of a weapon, comprising:
   (a) an imaging system (23) said imaging system having a beam path and an image plane (24), a given area of said image plane defining a measuring field (25);
   (b) a photoelectric, line-type sensor (26) mounted in said image plane (24) of said imaging system (23);
   (c) optical means (1) projecting light dots (I, II, III) corresponding to said line of sight and said target line into said measuring field (25);
   (d) means (27) for generating a linear relative motion between said measuring field (25) and said sensor (26) for scanning said light dots (I, II, III) in said measuring field (25) by said sensor (26);
   (e) means (37, 44) for storing signals representing in coordinates the nominal positions of said line of sight and said target line with respect to each other and for simultaneously determining one of said positions as the origin of a coordinate system;
   (f) electronic circuit means (31, 32, 53, 54) including said means (37, 44) for analyzing and evaluating electrical signals generated by said sensor (26) while scanning and light-dots (I, II, III) representative of the actual positions of said line of sight and said target line; and
   (g) means for displaying (39, 46) deviations of said actual positions of said line of sight and said target line from said nominal positions.

2. The apparatus of claim 1, further comprising means for adjusting said line of sight by means of signals generated by said deviations.

3. The apparatus of claim 1, wherein said optical means projecting light-dots corresponding to said line of sight and said target line into said measuring field (25) comprises light-dot projectors (1) having an adjustable, structured stop (6,50,59,60,61); said projectors (1) connected with optical instrumentation (10,11,12,13) defining a collimator system.

4. The apparatus of claim 1, wherein said means for generating a linear relative motion between said sensor (26) and said measuring field (25) is a pivotable mirror (27) mounted in front of said imaging system (23).

5. The apparatus of claim 1, wherein said means for generating a linear relative motion comprises a system supporting and guiding said sensor (26) in a linear reciprocating motion across said measuring field (25).

6. The apparatus of claim 4, further comprising an accessory (47–50;59) projecting by means of said pivoting mirror (27) an additional luminous marking (51) into said measuring field (25) and onto said sensor (26) corresponding to the occasional position of said pivoting mirror (27), whereby said sensor generates output signals from said luminous marking (51) which are proportional to the lateral deviations of said light-dots (I, II, III) from their nominal positions.

7. The apparatus of claim 6, wherein said accessory (47–50) is associated with a particular separate electric, line-type sensor (52) located outside said measuring field (25), said pivoting mirror (27) projecting said luminous marking (51) onto said sensor (52).

8. The apparatus of claim 6, further comprising second optical means (53) for tapping and deflecting an observation beam mounted in said beam path of the imaging system (23) and in front of said image plane (24).

9. The apparatus of claim 8, further comprising an infrared image collimator (65, 67–69).

10. A method for testing the correspondence of at least one line of sight of an optical instrument with at least one target line of a weapon, in an apparatus having:
   (a) an imaging system (23), said imaging system having a beam path and an image plane (24); a given area of said image plane defining a measuring field (25);
   (b) a photoelectric, line-type sensor (26) mounted in said image plane (24) of said imaging system (23);
   (c) optical means (1) projecting light-dots (I, II, III) corresponding to said line of sight and said target line into said measuring field (25);
   (d) means (27) for generating a linear relative motion between said measuring field (25) and said sensor (26) for scanning said light-dots (I, II, III) in said measuring field (25) by said sensor (26);
   (e) means (37, 44) for storing signals representing in coordinates the nominal positions of said line of sight and said target line with respect to each other and for simultaneously determining of one of said positions as origin of a coordinate system;
   (f) electronic circuit means (31,32,53,54) including said means (37,44) for analyzing and evaluating electrical signals generated by said sensor (26) while scanning said light-dots (I, II, III) representative of the actual positions of said line of sight and said target line; and
   (g) means for displaying (39,46) deviations of said actual positions of said line of sight and said target line from said nominal positions; the steps of the method comprising:
   (h) generating one light spot within said measuring field per line of sight and per target line and corresponding to the actual positions of said lines relative to each other;
   (i) selecting one of said light-dots as said reference point and as origin of a measurement coordinate system;
   (j) scanning said light-dots by said sensor during a linear relative motion between said measuring field and said sensor;
   (k) obtaining electric sensor output signals during the scanning and comparing same in a computer with corresponding signals read out of said means for storing and determining; and
   (l) displaying signals resulting from the comparison and representing the deviation of the actual measured position from the nominal position.

11. The method of claim 10, wherein on predetermining the nominal positions the point resulting from the intersection of said target line with said measuring field (25) is selected as a nominal reference point.

12. The method of claim 11, wherein before the scanning of the measuring field (25) and on constant orientation of the Light-dots (I, II, III) with respect to each other, the alignment of the light-dot corresponding to the target line of the measuring object ascertains the location of all further light-dots therein.

13. The method of claim 12, wherein said light-dots (I, II, III) are projected consecutively.

14. The method of claim 12, wherein said light-dots (I, II, III) are projected simultaneously.

15. The method of claim 10, further comprising the steps of:
using beam-deflecting and pivoting optical means for projecting beams generating said light-dots into said measuring field and for causing relative motion between said measuring field and said sensor; and generating in addition to said light-dots, a luminous marking the position of which on a second sensor corresponds to the particular position of said pivoting optical means so that output signals of said sensor are used to determine the lateral offset of the light-dots from a nominal position.

* * * * *